(12) United States Patent
Smoljo

(10) Patent No.: US 10,975,571 B1
(45) Date of Patent: Apr. 13, 2021

(54) TRUSS PLATES FOR JOINING MEMBERS (71) Applicant: Dragomir Smoljo, Bracebridge (CA)

(72) Inventor: Dragomir Smoljo, Bracebridge (CA)

( * ) Notice: Subject to any disclaimer, the term of this patent is extended or adjusted under 35 U.S.C. 154(b) by 0 days.

(21) Appl. No.: 16/840,575

(22) Filed: Apr. 6, 2020

(51) Int. Cl.
E04C 3/16 (2006.01)
E04C 3/292 (2006.01)
E04C 3/18 (2006.01)

(52) U.S. Cl.
CPC ............ E04C 3/16 (2013.01); E04C 3/18 (2013.01); E04C 3/292 (2013.01)

(58) Field of Classification Search
CPC ............... E04C 3/16; E04C 3/18; E04C 3/292
See application file for complete search history.

(56) References Cited

U.S. PATENT DOCUMENTS

| | | | | |
|---|---|---|---|---|
| 2,996,721 A * | 8/1961 | Black | ............. | B27F 7/155 227/152 |
| 3,068,483 A * | 12/1962 | Moehlenpah | ............. | B27F 7/155 100/193 |
| 3,068,484 A * | 12/1962 | Moehlenpah | ............. | B27F 7/155 227/152 |
| 3,069,684 A * | 12/1962 | Moehlenpah | ............. | B27F 7/155 227/152 |
| 3,207,406 A * | 9/1965 | Bowman | ............. | B27F 7/155 227/152 |
| 3,390,627 A * | 7/1968 | Levkovitz | ............. | B27F 7/155 100/41 |
| 3,479,783 A * | 11/1969 | Jureit | ............. | F16B 15/0046 52/700 |
| 3,823,522 A * | 7/1974 | Jureit | ............. | E04C 3/17 52/641 |
| 3,824,919 A * | 7/1974 | Moehlenpah | ............. | B27F 7/155 100/35 |
| 3,837,274 A * | 9/1974 | Zaccard | ............. | B23Q 3/18 100/35 |
| 3,908,885 A * | 9/1975 | Scott | ............. | B27F 7/155 227/152 |
| 3,939,548 A * | 2/1976 | Jureit | ............. | B27F 7/155 29/432 |
| 3,946,532 A * | 3/1976 | Gilb | ............. | E04C 3/292 52/692 |
| 3,985,459 A * | 10/1976 | Gilb | ............. | E04B 1/49 403/217 |
| 4,033,025 A * | 7/1977 | Jureit | ............. | B27F 7/155 29/417 |
| 4,154,164 A * | 5/1979 | Hammond | ............. | B27F 7/155 100/153 |

(Continued)

Primary Examiner — Rodney Mintz
(74) Attorney, Agent, or Firm — Elias Borges (57) ABSTRACT

Herein is disclosed a system for joining pieces of lumber, the system including a truss plate for attaching the pieces of lumber together and a mounting press for mounting the truss plate onto the lumber. The mounting press includes first and second flat plates with the first flat plate having a rod perpendicularly extending from a central portion thereof and the second plate having a centrally located rod aperture for receiving the rod. The rod is mated to a threaded collar and both are configured to press the first and second flat plates together when the collar is threaded onto the rod. The truss plate consists of a flat piece of metal having a plurality of teeth projecting from one side. An aperture is formed on the plate which is dimensioned to receive the rod.

9 Claims, 8 Drawing Sheets

(56) References Cited

U.S. PATENT DOCUMENTS

| | | | | |
|---|---|---|---|---|
| 4,184,621 | A * | 1/1980 | Epes | B27F 7/155 227/26 |
| 4,225,095 | A * | 9/1980 | Jureit | B27F 7/155 206/343 |
| 4,230,310 | A * | 10/1980 | Henggeler-Achermann | B27F 7/155 100/913 |
| RE31,234 | E * | 5/1983 | Jureit | E04B 1/3441 403/163 |
| 4,653,242 | A * | 3/1987 | Ezard | F16B 15/0038 14/75 |
| 4,738,071 | A * | 4/1988 | Ezard | F16B 15/0046 52/745.19 |
| 5,214,900 | A * | 6/1993 | Folkerts | E04B 5/12 52/696 |
| 5,301,487 | A * | 4/1994 | Wiebe | E04B 1/26 52/742.12 |
| 5,350,265 | A * | 9/1994 | Kinner | E04B 1/0007 411/160 |
| 5,622,022 | A * | 4/1997 | Haisch | E04C 3/17 52/654.1 |
| 5,966,892 | A * | 10/1999 | Platt | E04B 1/26 403/386 |
| 6,299,378 | B1 * | 10/2001 | Griffith | F16B 15/0046 403/293 |
| 6,907,820 | B2 * | 6/2005 | Jin | B27F 7/155 100/231 |
| 7,716,887 | B2 * | 5/2010 | Fouch | E04B 1/26 52/293.3 |
| 9,404,257 | B2 * | 8/2016 | Reno | E04G 21/1891 |
| 10,870,991 | B2 * | 12/2020 | Brakeman | E04C 3/16 |
| 2002/0195004 | A1 * | 12/2002 | Mead | F16B 15/0046 100/35 |
| 2004/0181936 | A1 * | 9/2004 | Jin | B27F 7/155 29/798 |
| 2008/0048375 | A1 * | 2/2008 | Rolfe | B25B 5/101 269/249 |
| 2016/0024791 | A1 * | 1/2016 | Reno | E04C 3/02 52/745.21 |
| 2019/0093361 | A1 * | 3/2019 | Brakeman | E04C 3/16 |

* cited by examiner

TRUSS PLATES FOR JOINING MEMBERS

CROSS-REFERENCE TO RELATED APPLICATION

This application claims priority from U.S. provisional application No. 62/832,432 filed Apr. 11, 2019 the entirety of which is incorporated herein by reference.

BACKGROUND OF THE INVENTION

Truss plates are often used to join together pieces of 2×4 lumber in order to construct preassembled roof components and the like. The truss plates generally consist of a flat metal plate having a plurality of teeth formed thereon which project out of one side of the thrust plate. The teeth are formed by punching the plate with a die to form a series of rectangular openings, each with an adjoining tooth projecting perpendicularly away from the plate by several mm. The plate therefore has a large number of sharp pointed teeth projecting from one side of the plate and can be attached to a piece of lumber by pressing the plate into the lumber with a great deal of force.

When two pieces of lumber which are to be joined by the thrust plates, the two pieces of lumber are cut as required and placed together to forma joint. The joint is then sandwiched between a pair of opposing truss plates with the teeth of each plate facing the cut lumber, preferably with half of each plate facing each of the pieces of lumber. The cut lumber and truss plates are positioned together in a hydraulic press which then applies hundreds or thousands of pounds of pressure on the plates to force them towards each other causing the teeth of the plates to be forced into the lumber. The truss plates then effectively secure the two pieces of lumber together with a secure connection.

It can be appreciated that the use of truss plates has made the mass construction of structural lumber components more cost effective. Of course, these truss plates require the use of heavy duty hydraulic presses and a manufacturing facility structured to facilitate those presses. As a result, the use of truss plates to form trusses or other lumber components cannot be done on the fly or in the field. An improved system of manufacturing and using truss plates which does away with these complications is therefore advantageous.

SUMMARY OF THE INVENTION

The present invention is directed at a system for joining pieces of lumber by hand. The system includes a truss plate for attaching the pieces of lumber together and a truss plate mounting press for mounting the truss plate onto the pieces of lumber. The truss plate mounting press includes a first flat plate, the first flat plate having a rod perpendicularly extending from a central portion of the first plate, and a second flat plate having a centrally located rod aperture dimensioned to receive the rod. One end of the rod is threaded, the threaded end of the rod being configured to thread to a threaded collar with the threaded collar being configured to press the first and second flat plates together when the collar is threaded onto the rod. The truss plate includes a flat piece of metal having opposite sides, opposite ends and opposite side edges with a plurality of teeth projecting upwardly from one of said opposite sides. A first aperture is formed on the plate between the opposite ends and opposite side edges, the first aperture dimensioned to receive the rod portion of the truss plate mounting press.

The invention is also directed at a method of using the system described above to joint two pieces of lumber. The method includes the steps of placing the two pieces of lumber in abutting arrangement and forming a hole in at least one of the two pieces of lumber adjacent where the pieces of lumber abut with the hole being dimensioned to receive the rod of the truss plate mounting press. The method further includes the step of placing the truss plate flat onto the first plate by passing the first aperture of the truss plate onto the rod with the plurality of teeth facing away from the first plate and then passing the rod through the hole. The second plate is then placed onto the rod such that the lumber is positioned between the first and second plates with the teeth of the truss plate facing the lumber. The collar is then threaded onto the threaded end of the rod and then further threaded onto the rod so as to urge the first and second plates towards each other. The collar is then further tighten onto the rod to drive the plurality of teeth into the pieces of lumber to firmly secure the pieces of lumber together by mutual attachment to the truss plate. Finally, the collar is unthreaded from the rod and the truss plate mounting place can be removed from the pieces of lumber.

DESCRIPTION OF THE DRAWINGS

In the drawings like characters of reference indicate corresponding parts in the different figures.

DETAILED DESCRIPTION OF THE INVENTION

Figure 1:
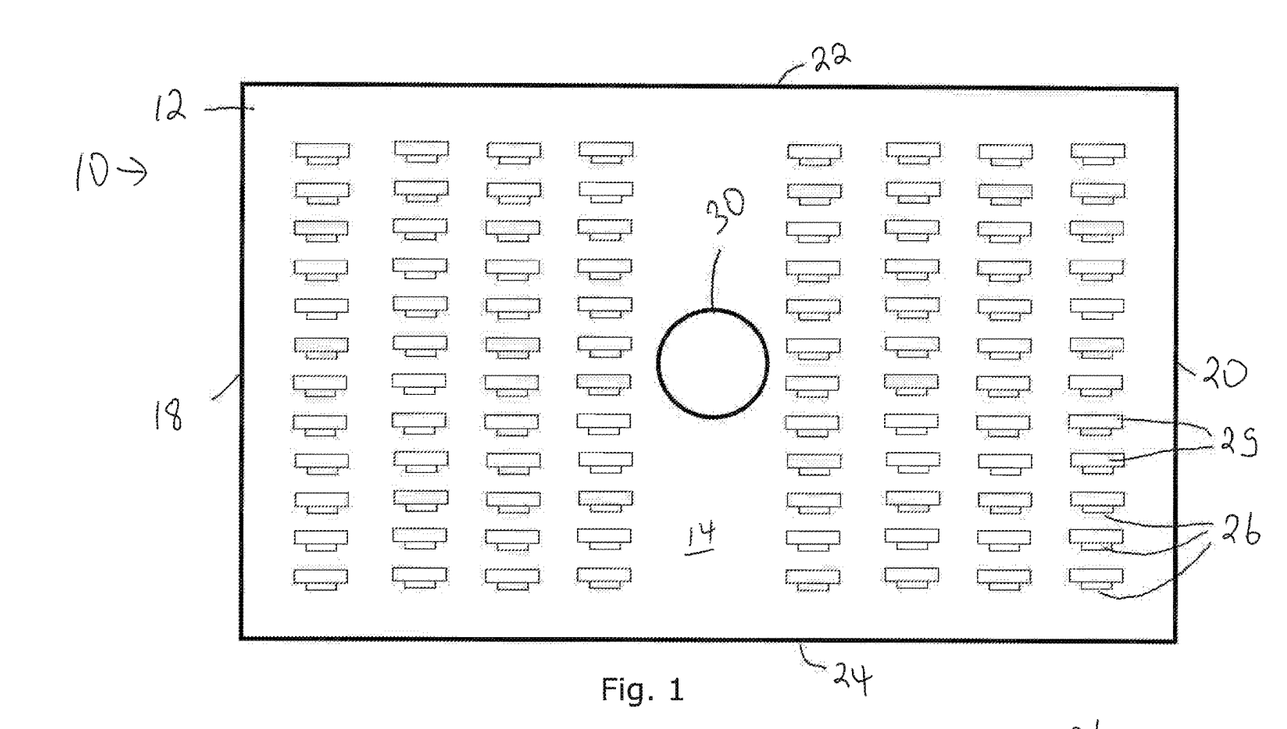
FIG. 1 is a top view of a truss plate made in accordance with the present invention.
Figure 2:
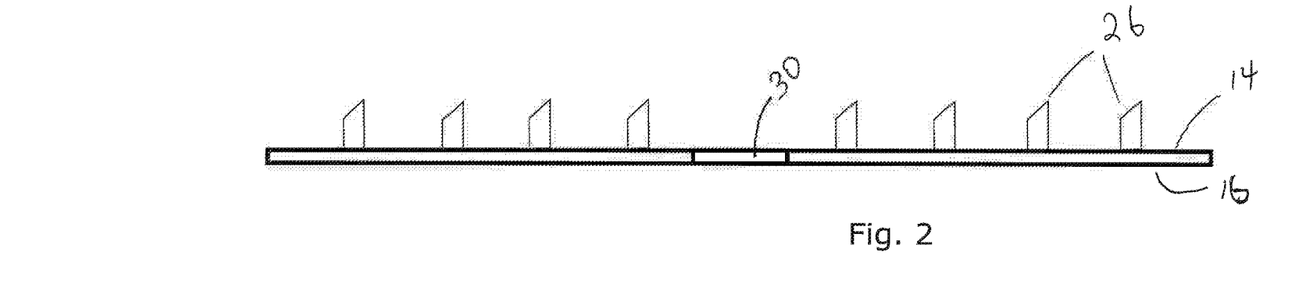
FIG. 2 is a side view of the truss plate shown in FIG. 1.

Referring firstly to FIGS. 1 and 2, a truss plate made in accordance with the present invention is shown generally as item 10 and includes a flat metal plate 12 having opposite side 14 and 16, opposite ends 18 and 20 and opposite sides 22 and 24. A plurality of teeth 26 are formed on side 14 of the plate and a central portion 28 has an aperture 30 formed roughly centrally in plate 10 between sides 22 and 24. Teeth 26 are formed from part of punched holes 25 as in a standard truss plate. Aperture 30 may be positioned exactly midway between ends 18 and 20, or in some embodiments, the aperture may be closer to end 18 or end 20, depending on the intended application of the truss plate. Flat metal plate 12 is preferably made of galvanized steel or any other suitably strong and rigid metal or material.

Figure 3:
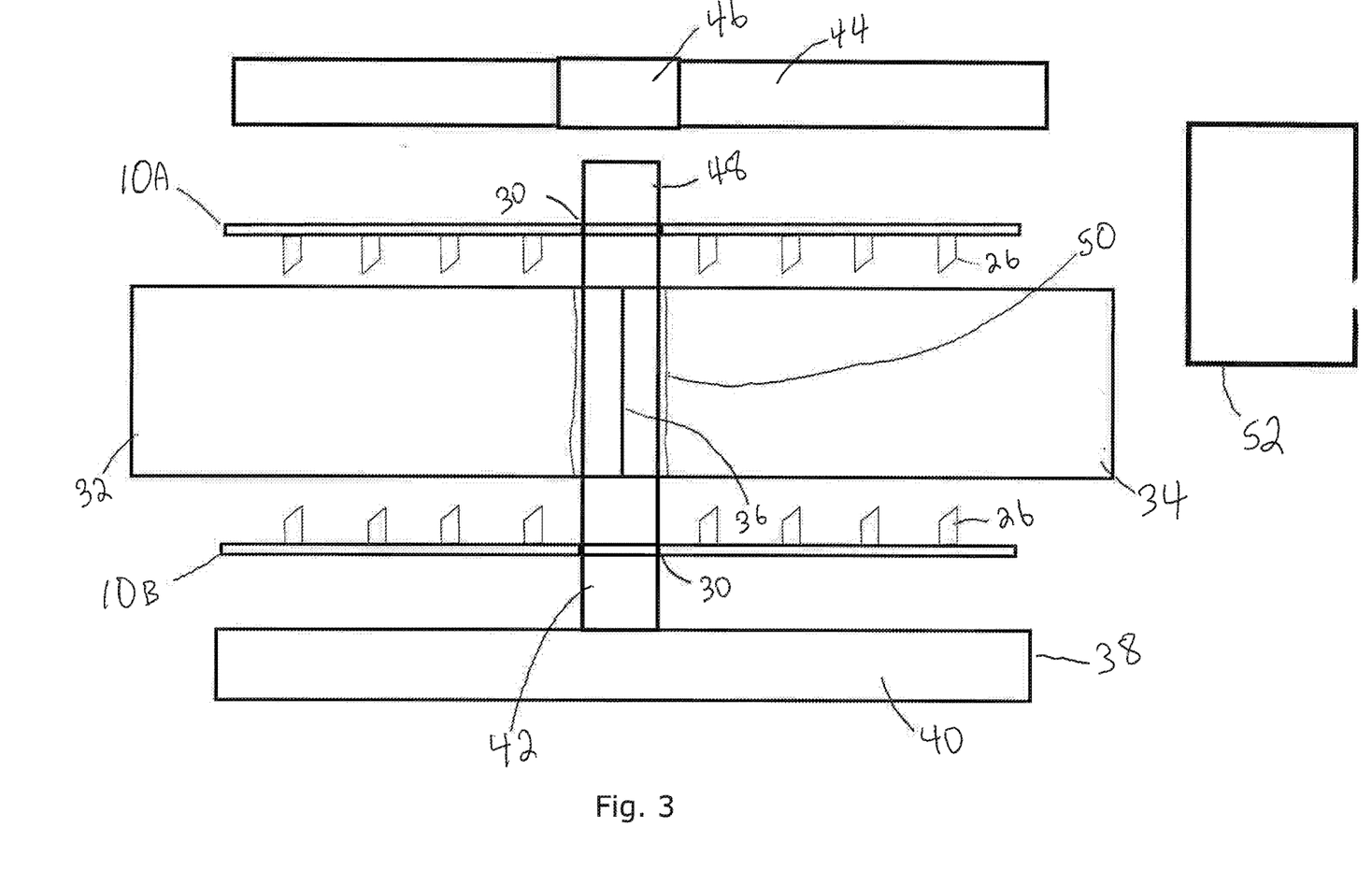
FIG. 3 is a side view of a pair of truss plates made in accordance with the present invention being mounted to cut lumber in accordance with the method of the present invention using a truss plate mounting press made in accordance with the present invention.
Figure 4:
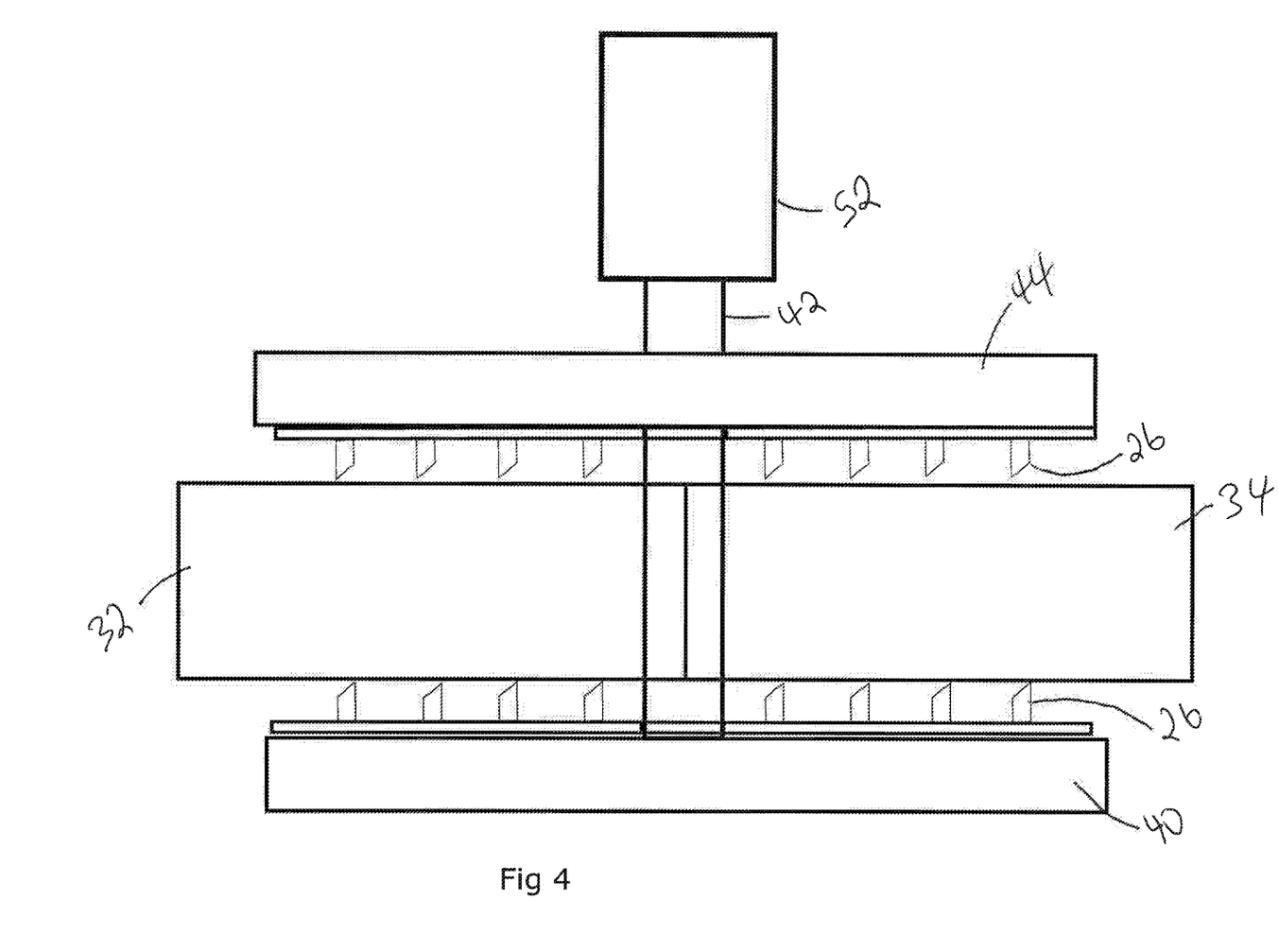
FIG. 4 is a side view of the pair of truss plates shown in FIG. 3 showing the truss plates being positioned on the cut lumber using the truss plate mounting press shown in FIG. 3.
Figure 5:
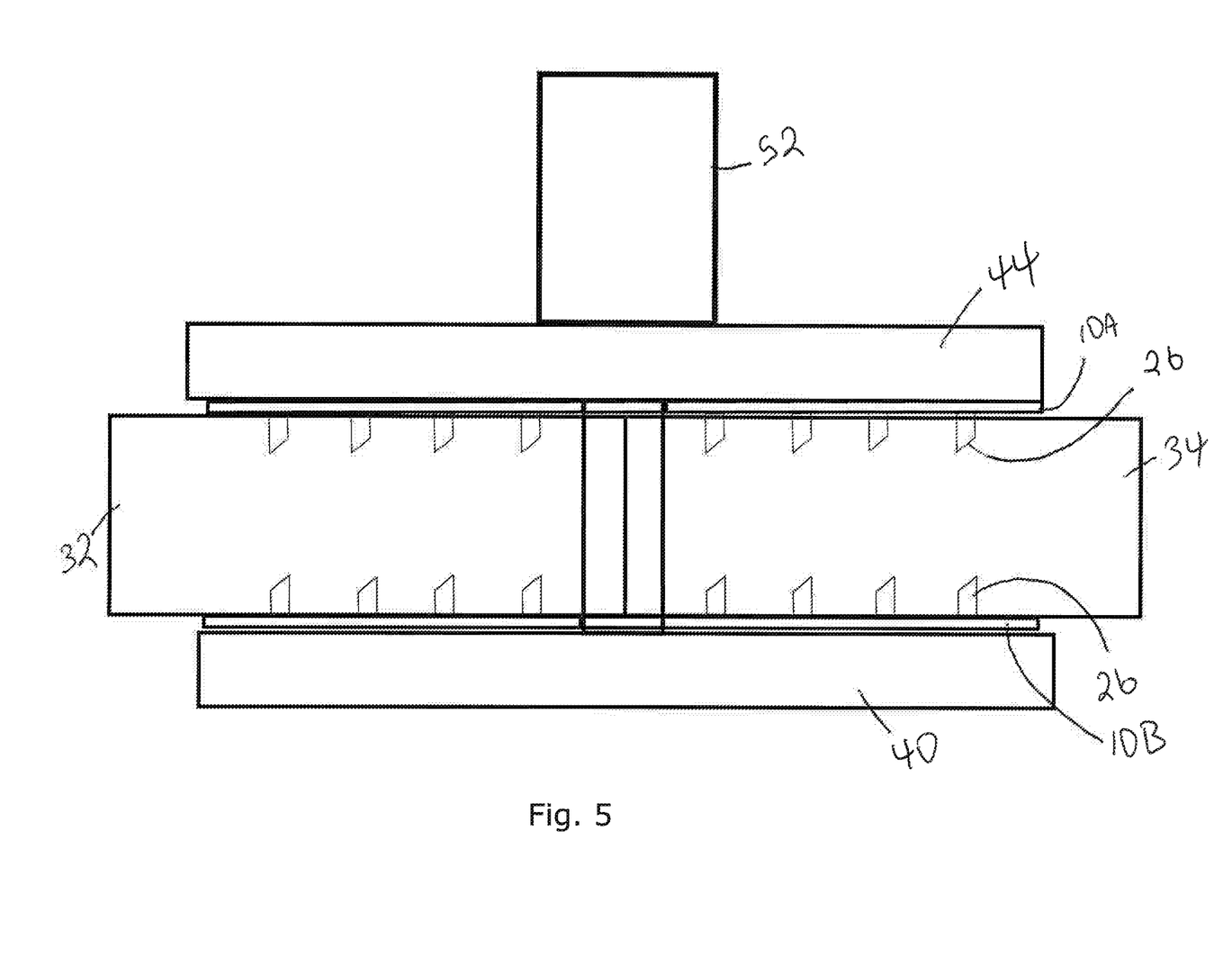
FIG. 5 is a side view of the pair of truss plates shown in FIG. 3 showing the truss plates being urged towards each other using the truss plate mounting press shown in FIG. 3.
Figure 6:
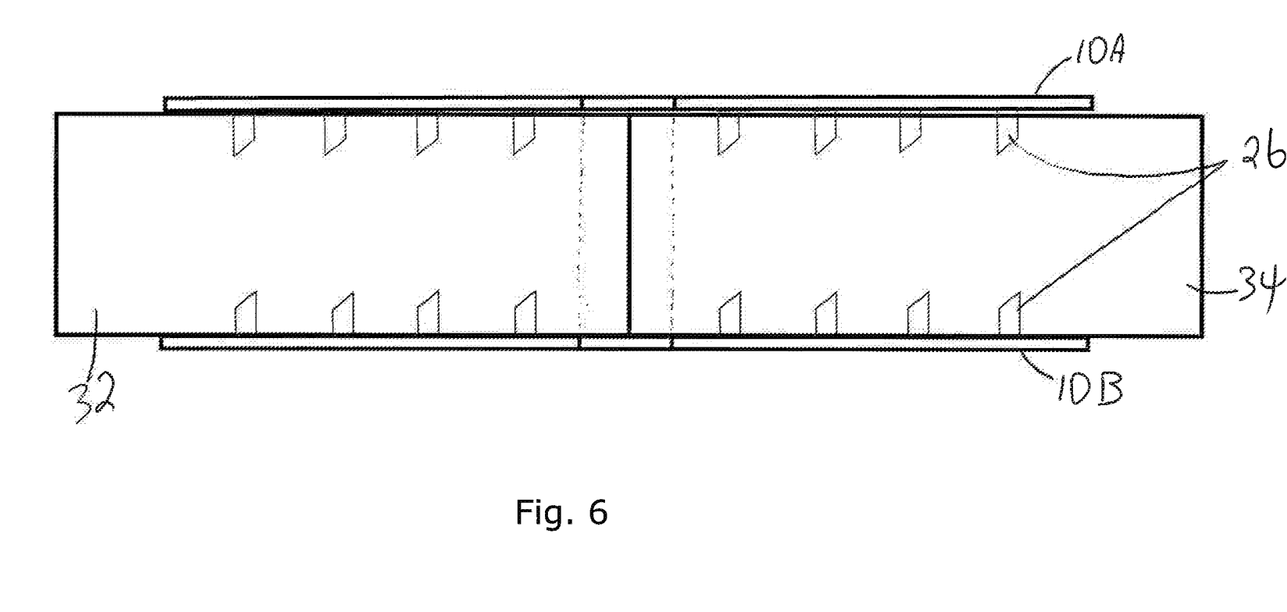
FIG. 6 is a side view of the pair of truss plates shown in FIG. 3 showing the truss plates joining the cut lumber together.

Referring now to FIG. 3, the truss plate of the present invention is used to join two pieces of cut lumber, namely 2×4 ends 32 and 34. Lumber pieces 32 and 34 are abutted together at joint 36 and a tap hole or aperture 50 is formed at the joint. The joint is to be made permanent by means of identical truss plates 10A and 10B and the portable press 38. Portable press 38 consists of a flat steel plate 40, rod 42 which is rigidly mounted perpendicularly to plate 40 and upper plate 44. Plates 40 and 44 and rod 42 are all preferably made of carbon steel with rod 42 being welded to plate 40 to be rigidly attached to the plate. Plate 44 has aperture 46 which is dimensioned to receive rod 42. Rod 42 has threaded end 48 permitting a threaded collar 52 to be threaded onto rod 42. Apertures 30 of plates 10A and 10B are dimensioned to receive rod 42. Plates 10A and 10B are substantially identical to truss plate 10 in FIG. 1. To join lumber pieces 32 and 34, plate 10B is first threaded onto rod 42 with teeth 26 of the plate 10B oriented upwardly. Lumber pieced 32 and 34 are then aligned onto rod 42 so that the rod passes through aperture 50. Plate 10A is then threaded onto rod 42 with teeth 26 of the truss plate oriented downwardly. Then, upper plate 44 is oriented such that aperture 46 is coaxially aligned with rod 42. Collar 52 can then be threaded onto end 48. When plate 40, rod 42, lumber 32 and 34, truss plates 10A and 10B, plate 44 and collar 52 are all coaxially aligned, the plates can be moved towards each other such that teeth 26 contacts the surface of lumber pieces 32 and 34. as seen in FIG. 4. Rotating collar 52 then urges plates 44 and 40 towards each other, forcing truss plates 10A and 10B towards each other forcing teeth 26 to penetrate deeply into lumber pieces 32 and 34. Of course, the torsional force required to be applied to collar 52 to force plates 40 and 44 is significant, requiring the use of a long ratchet arm or wrench. Preferably a long torque wrench which is configured to lock onto collar 52 is used to allow the operator to torque the collar by hand with sufficient torsional force to force plates 10A and 10B to be fully inserted into lumber pieces 32 and 34 as seen in FIG. 5. When teeth 26 of the truss plates are fully inserted into lumber pieces 32 and 34, then the collar can be unscrewed, and plates 40 and 44 removed leaving only the joined pieces of lumber (see FIG. 6). Since the clamping device 38 (FIG. 3) is relatively small, and since the joining operation can be performed by hand in the field using simple wrenches, it is possible for a user to join pieces of lumber together using truss plates without the need of hydraulic presses.

Figures 7, 8:
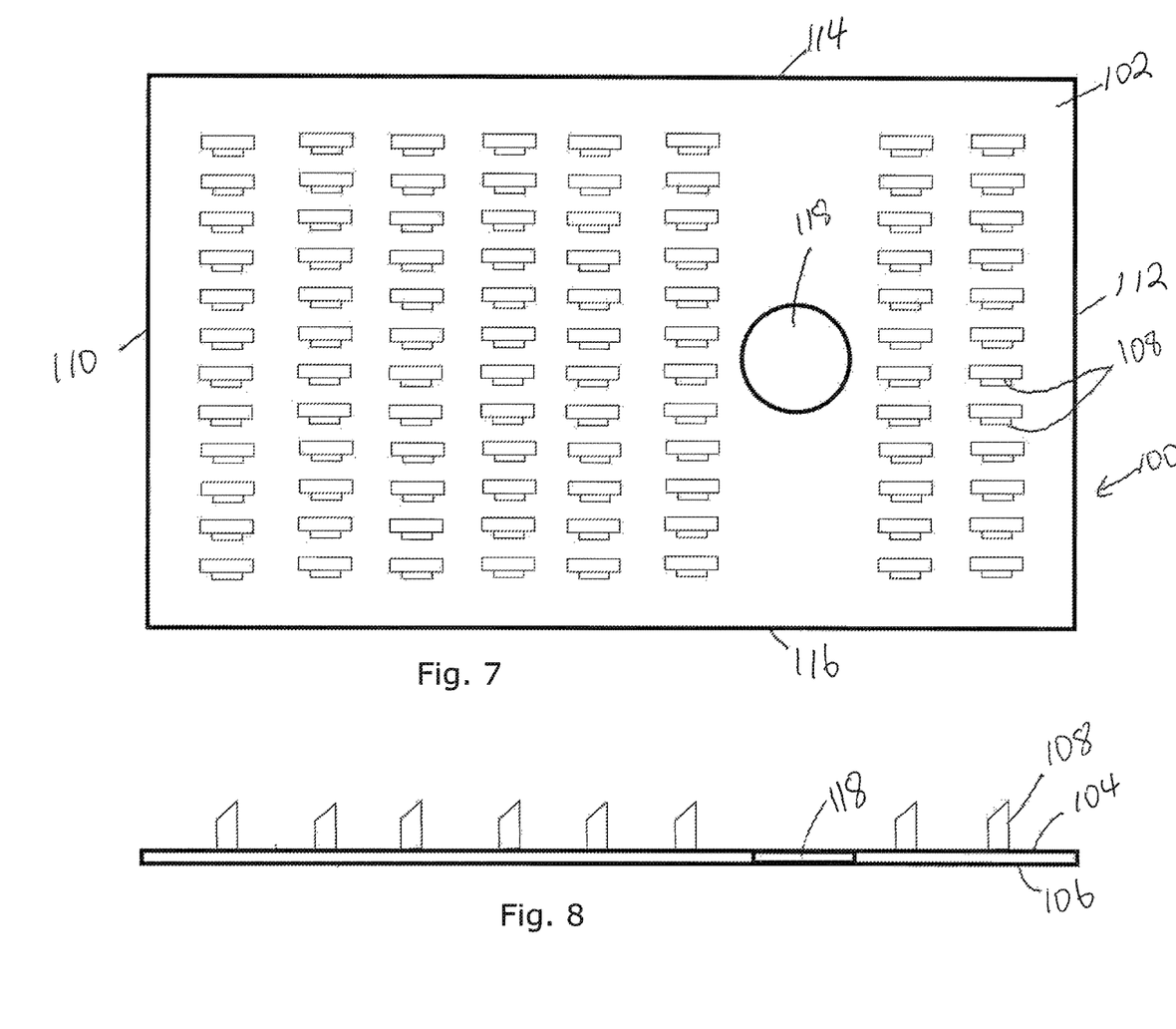
FIG. 7 is a top view of an alternate embodiment of the truss plate made in accordance with the present invention.
FIG. 8 is a side view of the truss plate shown in FIG. 7.

Referring now to FIGS. 7 and 8, an alternate embodiment of the truss plate made in accordance with the present invention is shown as item 100. Truss plate 100 consists of a flat steel plate 102 having opposite sides 104 and 106 with teeth 108 projecting upwardly from side 104. Aperture 118 is positioned on plate 102 midway between side edges 114 and 116 and between ends 110 and 112. In the embodiment shown in FIG. 7, aperture 118 is positioned closer to end 112 relative to end 110. This sort of plate can be used where the joint is in a tight corner.

Figures 9, 10:
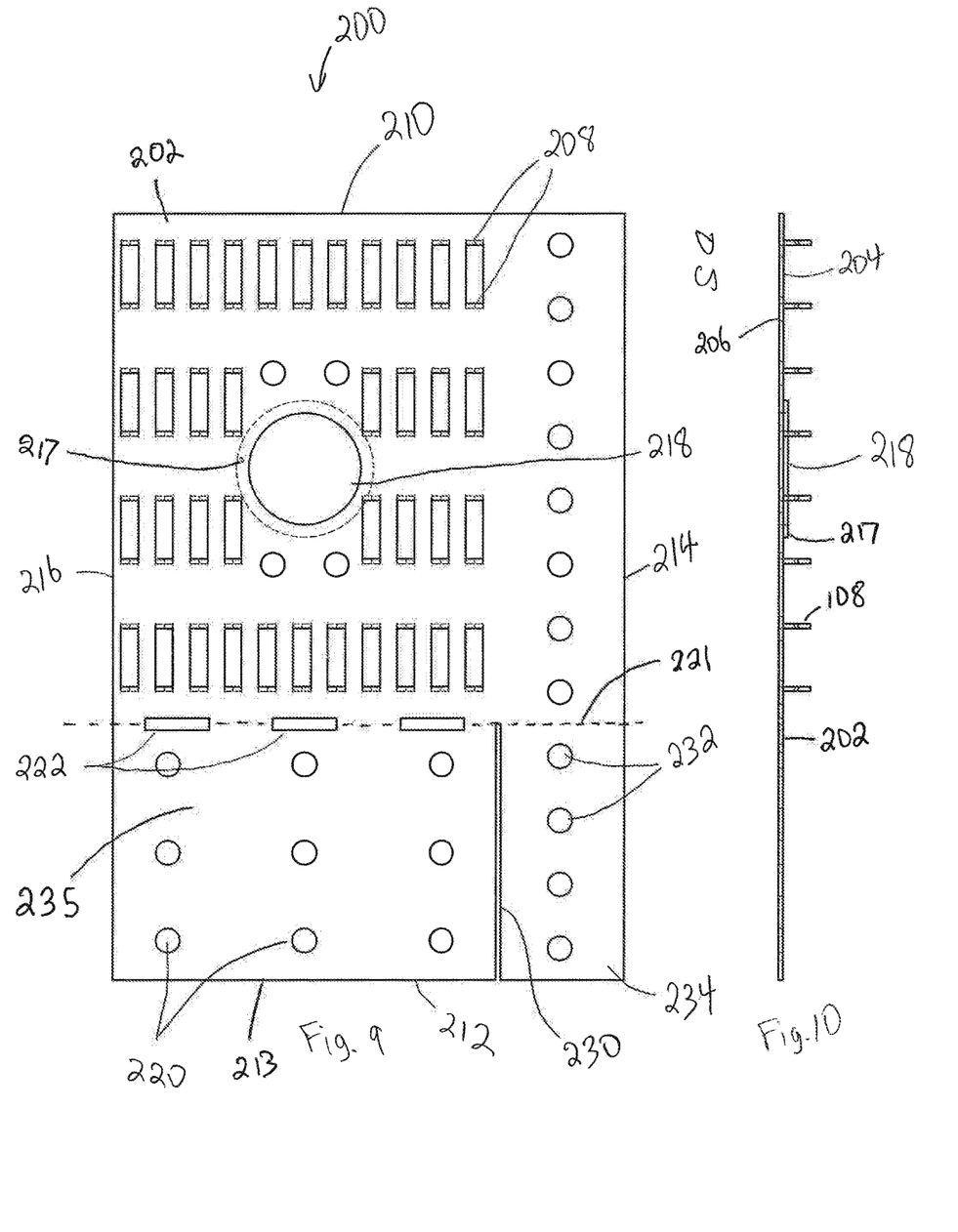
FIG. 9 is a top view of yet another alternate embodiment of the truss plate made in accordance with the present invention.
FIG. 10 is a side view of the truss plate shown in FIG. 9.

Another alternate embodiment of the truss plate made in accordance with the present invention is shown in FIGS. 9 and 10 as item 200. Truss plate 200 consists of a flat steel plate 202 having opposite sides 204 and 206 with teeth 108 projecting upwardly from side 204. Aperture 218 is positioned on plate 202 midway between side edges 214 and 216 and between ends 210 and 212. Aperture 218 is positioned on plate 202 such that the aperture is surround by teeth 108. In the embodiment shown in FIG. 9, aperture 218 is positioned closer to end 210 relative to end 212. Additional apertures 220 are formed between aperture 218 and end 210. Apertures 220 are dimensioned to receive screws or nails (not shown) for securing end 210 of plate 200 to a cut piece of lumber by means of said screws and nails. Additional apertures/score marks/slots 222 are provided in a line between aperture 218 and apertures 220. Slots 222 are aligned to permit plate 202 to bend along line 221 which effectively acts as a fold line. This permits plate 202 to be bent or folded at apertures 222 to permit the truss plate to be used to mount cut lumber pieces which are mounted partly at right angles to each other.

An elongated slot 230 extends perpendicularly from edge 213 of end 212. Slot 230 extends parallel to side edges 214 and 216 but is closer to side edge 214. Slot 230 extends to fold line 221 and divides the end of plate 200 adjacent end 212 into portion 234 and 235 permitting portion 235 to be folded along fold line 221 while leaving portion 234 coplanar with the rest of plate 200 (or vice versa). Additional apertures 232 are positioned on portion 234 adjacent side edge 214 such that nails or screws can be used to secure portion 234. Plate 200, having additional features, provides a more versatile truss plate capable of being used in a plurality of different scenarios. This sort of plate can also be used where the joint is in a tight corner or where the joint is formed between two pieces of lumber at right angles to each other. In the case of the joint being two pieces of lumber held at right angles to each other, plate 200 can be folded with the teeth securing one piece of lumber and either screws or nails being used to secure the other piece of lumber to the plate.

Aperture 218 is concentrically surrounded by a support ring 217. Support ring 217 may consist of a separate metal reinforcing ring mounted to the plate 202 by spot welding or the like, or it preferably comprises a stamping of plate 202 to form a raised annular portion surrounding aperture 218. Support ring 217 is used to provide additional stiffness to the portion of plate 202 where aperture 218 is formed and helps ensures that the portion of the plate adjacent aperture 218 remains flat.

Figure 11:
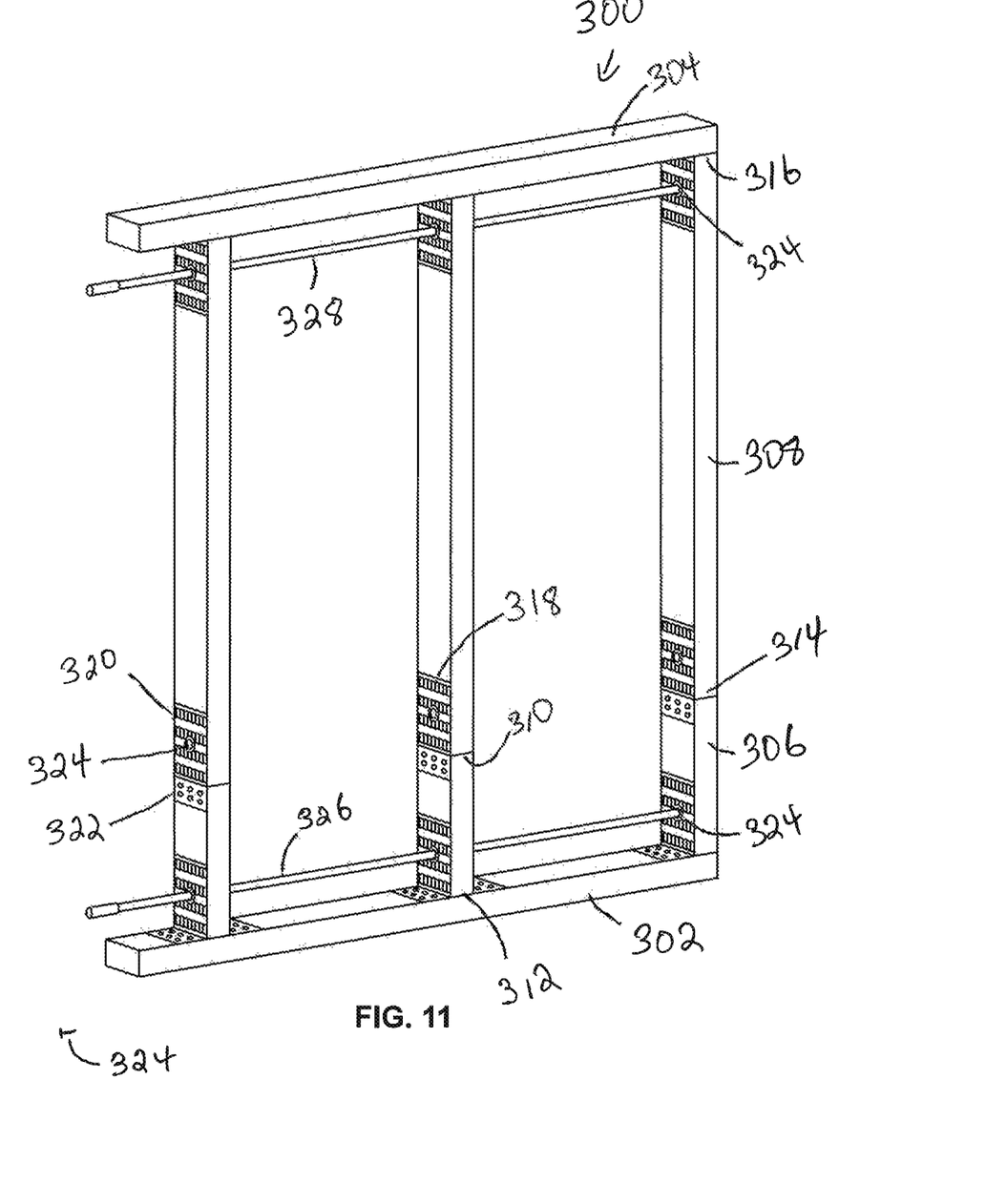
FIG. 11 is a perspective view of a wall constructed using the truss plates of the present invention.

Referring now to FIG. 11, a wall construction 300 can be made using horizontal lumber pieces 302 and 304, and vertical pieces 306 and 308. Pieces 306 have ends 310 and 312 and pieces 308 have ends 314 and 316. Truss plates 318 made in accordance with the present invention are used to join the pieces of lumber together to form a much stronger wall construction. Truss plates 318 are very similar to truss plates 200 (see FIGS. 9 and 10) and have a first portion 320 and second portion 322. First portion 320 has a plurality of teeth which are identical to those described with reference to truss plates 200. Second portion 322 of truss plates 318 have a plurality of apertures dimensioned to receive fastening screws 324. As with previous embodiment 200, truss plate 318 has a fold line to permit truss plate 318 to be folded such that portions 320 and 322 are at a right angle to each other. Using a combination of flat truss plates 318, vertical lumber pieces 306 and 308 can be joined together abutting ends 310 and 314 to form long vertical members. These vertical members can then be securely mounted to horizontal lumber piece 302 by using folded truss plates 318 as illustrated. To use truss plates 318 to mount the vertical members to horizontal lumber 302, holes will have to be formed in pieces 306 adjacent ends 312. A horizontal support rod (or cable) 326 can be passed through the holes in lumber 306 and apertures 324 of truss plates 318 adjacent ends 312.

Likewise, horizontal support rod (or cable) 328 can be passed through the truss plates 318 mounting lumber pieces 308 to lumber 304. Horizontal support rods 326 and 328 can add significant structural strength to wall 300 making the wall better suitable for constructions likely to experience earthquake or hurricane conditions.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A method of joining two pieces of lumber comprising the steps of:
    (a) providing a truss plate mounting press configured for mounting a truss plate onto the pieces of lumber, the truss plate mounting press comprising a first flat plate, the first flat plate having a rod perpendicularly extending from a central portion of the first flat plate, a second flat plate having a centrally located rod aperture dimensioned to receive the rod, an end of the rod being threaded, the threaded end of the rod being configured to thread to a threaded collar, the threaded collar being configured to press the first and second flat plates together when the collar is threaded onto the rod;
    (b) providing the truss plate configured for attaching the pieces of lumber together, the truss plate comprising a flat piece of metal having opposite sides, opposite ends and opposite side edges, a plurality of teeth projecting upwardly from one of said opposite sides, a first aperture being formed on the truss plate between the opposite ends and opposite side edges, the first aperture dimensioned to receive the rod of the truss plate mounting press;
    (c) placing the two pieces of lumber in abutting arrangement;
    (d) forming a hole in at least one of the two pieces of lumber adjacent where the pieces of lumber abut, the hole being dimensioned to receive the rod of the truss plate mounting press;
    (e) placing the truss plate flat onto the first flat plate by passing the first aperture of the truss plate onto the rod with the plurality of teeth facing away from the first flat plate;
    (f) passing the rod through the hole and positioning the second flat plate onto the rod such that the lumber is positioned between the first and second flat plates with the teeth of the truss plate facing the lumber;
    (g) threading the collar onto the threaded end of the rod and threading the collar further onto the rod so as to urge the first and second flat plates towards each other;
    (h) tightening the collar further to drive the plurality of teeth into the pieces of lumber to firmly secure the pieces of lumber together by mutual attachment to the truss plate, and
    (i) unthreading the collar from the rod and removing the truss plate mounting press from the pieces of lumber.

2. The method of claim 1 wherein the truss plate further comprising a plurality of second apertures, the second apertures being dimensioned to receive a nail or mounting screw.

3. The method of claim 1 wherein the truss plate is a first truss plate, and further including the step of placing a second truss plate identical to the first truss plate on the rod after the rod is passed through the hole but before the second flat plate is placed on the rod, the second truss plate being oriented such that the teeth of the second truss plate are oriented towards the pieces of lumber, the collar being threaded onto the rod sufficiently to drive the teeth of both truss plates fully into the pieces of lumber.

4. The method of claim 1 wherein the first aperture is positioned adjacent the plurality of teeth such that the plurality of teeth at least partially surround the first aperture.

5. The method of claim 4 wherein the truss plate is a first truss plate, and further including the step of placing a second truss plate identical to the first truss plate on the rod after the rod is passed through the hole but before the second flat plate is placed on the rod, the second truss plate being oriented such that the teeth of the second truss plate are oriented towards the pieces of lumber, the collar being threaded onto the rod sufficiently to drive the teeth of both truss plates fully into the pieces of lumber.

6. The method of claim 1 wherein the truss plate further comprises a plurality of first elongated slots, the first elongated slots aligned to form a fold line where the truss plate is configured to be folded, the first elongated slots being separated from each other by a distance.

7. The method of claim 6 wherein the truss plate further comprises a second elongated slot extending from an edge of the truss plate, the slot oriented perpendicular to the fold line and extending between the fold line and the edge.

8. The method of claim 1 wherein the truss plate further comprises a support ring concentrically surrounding the first aperture.

9. The method claim 8 wherein the support ring comprises a stamped portion of the truss plate.

* * * * *